United States Patent Office 3,393,106
Patented July 16, 1968

3,393,106
METHOD FOR FORMING PATTERNED SHEET MATERIALS
Henry James Marrinan and Eric Ivan Riseley, Harrogate, England, assignors to Imperial Chemical Industries Limited, Millbank, London, England, a corporation of Great Britain
No Drawing. Filed July 15, 1965, Ser. No. 472,302
Claims priority, application Great Britain, July 21, 1964, 29,433/64
10 Claims. (Cl. 156—232)

ABSTRACT OF THE DISCLOSURE

A method is described for forming a patterned surface sheet material from a slow-curing, tacky plastic composition by coating the composition on a patterned release band, e.g. polyethylene, which possesses release properties on both faces. The thus coated band is rolled up and stored during curing of the coating and the coating is then removed from the release band. The sheet material may be self-supporting or it may be coated on a substrate, for example, a fabric.

---

The present invention relates to an improved process for the production of sheet material. In particular, but not exclusively, it relates to the production of sheet materials formed with a patterned surface.

In the manufacture of many plastic surfaced sheet materials, it is common practice to provide the final surface with a pattern, for decorative or other purposes, by embossing between suitable patterned rollers while the plastic surface is in a softened state. Further, a very fine emboss may be used to scatter light to produce a dulled surface effect, and this may be varied as desired to control surface gloss. Similar emboss patterns are also obtained by casting a liquid composition on a patterned surface which remains in contact while a gelling or solidification treatment lasting up to several minutes is carried out, following which the newly patterned surface is removed and the surface on which it was cast is available for re-use.

Since it is clearly preferable that this casting surface should not adhere to the solidified, newly-cast surface, this second process has been termed a "release band" process. The casting surface is frequently made of silicone rubber, the pattern on it having been made initially by casting on a sheet of plastic material whose surface has been patterned in the softened state by embossing rollers. The "release band" thus serves as a master copy of the original embossing rollers. This master copy is costly and difficult to make, but it provides a means by which some plastic materials not suitable for direct embossing can be patterned, provided that any gelling or other solidification treatment is sufficiently short to be completed by the time the release band completes its passage through the machine effecting this treatment. In practice, with such a release band, economic reasons make it undesirable for this time to exceed about one hour, since the band is usually required for repeat processing. However, certain plastic coating compositions, notably polyurethane compositions, are in certain circumstances used under conditions in which the solidification or curing takes many hours, and even several days. If the release band is removed too soon, fine detail in the pattern is lost, and there may also be some unwanted dulling of the surface. With these same coating compositions, direct roller embossing is not practicable because the coating is very tacky before it is cured, and after curing its rubber nature leads to rapid recovery from deformation, even when hot.

It is an object of the present invention to provide a process whereby a pattern, particularly a relief pattern, can be applied to a sheet of such a slow-curing, tacky, plastic composition.

It is a further object of the invention to provide a fabric having a patterned surface coating of such a plastic composition.

According to the present invention a patterned surface sheet material is produced from a slow-curing tacky plastic composition by coating said composition on a patterned release band of which both faces possess release properties, rolling up said coating and release band, storing during curing of the coating, and thereafter removing the patterned coating from the release band.

A second and/or further layers may be applied to said coating, being layers of similar compositions or of different but mutually adhering materials, including knitted, woven and nonwoven fabrics. The additional layers may be applied after removing part or all of the solvent contained in the first coating of slow-curing tacky composition.

According to another aspect of the present invention, a method of forming a patterned surface sheet material comprises coating a slow-curing tacky plastic composition on a patterned release band of which both faces possess release properties, rolling up said coating and release band and storing until the coating is cured or partially cured, unrolling the coating and release band and bringing the coating into contact with an adherable sub-strate, again rolling up the release band, coating and sub-strate, storing at least until curing of the coating is completed, and thereafter removing the coated sub-strate from the release band.

The adherable sub-strate may be a sheet or fabric coated with a layer of similar slow-curing tacky composition, and the tacky layer may be provided over a previously cured or partly cured layer of similar composition.

This provides a commercially attractive method of providing relative small quantities of material of a specific surface from a basic stock of sub-strate material. For example, various colours and finishes of coating could be applied to a stock sub-strate such as a coated nonwoven material produced to replace natural leather. Both the coating and the sub-strate could be stored rolled in a release band having release properties on both faces.

The patterned release band or the adherable sub-strate may be coated with the coating composition by means of a knife, roller, brush or sprays either as a plasticized liquid or in solution at one or more coating positions in succession. After each coating position a solvent extraction system may be used to remove part or all of any solvent present. The first coat applied will eventually be the outer surface of the coated fabric, and this first coat is the one in which the patterned surface is cast. After the solvent extraction (if any) the fabric to be coated is brought into contact with the last coating layer to be applied and passed through nip rolls to assist the adhesion of the former to the latter. If necessary a further adhesive or a filler coat may be directly applied to the uncoated fabric before it meets the layers carried by the release band. Immediately after the nip rolls, or if necessary after further solvent extraction through the fabric, the release band, the various coating layers, and the fabric are wound up together. The wound roll is then stored under the appropriate conditions until the desired state of cure is reached, when the release band is removed in a simple rewinding process.

The process of the present invention is of particular advantage when the coating compositions used must, for one reason or another, be solidified or cured slowly, and when the uncured coating is tacky and soft so that there is danger of marring the patterned surface if the release band is removed. This is particularly true of polyurethane coatings. Rapidly curing mixtures of such compositions can be made, but such mixtures have an inconveniently short pot life, and in addition are prone to produce unsatisfactory, for example bubbly, coats. Because of the need to retain the release band in contact with the coating for long periods, considerable quantities of patterned release bands are required, so that the normally used silicone rubber cast sheet represents a high capital outlay. It also normally requires the support of a sub-strate, is expensive, particularly when two release faces are provided on the band, and is prone to surface damage which severely limits its re-use. It has the additional disadvantage that surfaces cast on it are slightly contaminated with silicones, which may hinder the adhesion of the coated fabric if this should be desired in later use. Again, water vapour permeability of the coating is also somewhat reduced by this contamination, and this may be undesirable.

We find that excellent release bands of which both surfaces have release properties can be provided from polyethylene sheet. It is cheap, and has the two further advantages that it can be embossed between rollers rather than having to be cast, and its surface shininess can be controlled easily during manufacture.

The invention will be further described, by way of example, with reference to a process in which the following operations were carried out:

(a) A length of polyethylene sheet, 0.005 inch thick, was provided with an embossed (or relief) pattern by passing it through a heated zone and then between an embossing roll and a rubber surfaced pressure roll in known manner.

(b) The pattern polyethylene sheet was then fed to a coating machine and was coated with a coating composition, consisting of a 40% solution of a slow-curing, tacky polyurethane in methyl ethyl ketone, by means of a doctor knife. The gap between the doctor knife and the polyethylene sheet was set at 0.01 inch and after passing under the doctor knife the polyethylene sheet carried a 0.005 inch thick layer of the polyurethane coating composition. The coated polyethylene sheet was then passed through a warm air oven for about 2 minutes, during which time a major proportion of the solvent was evaporated from the polyurethane coating layer. The polypropylene sheet and the partially cured polyurethane coating layer were then wound up.

(c) A non-woven, fibrous sheet material was passed through the coating machine, with the gap between the doctor knife and the sheet material set at 0.008 inch, and a layer of the same polyurethane coating composition as used in (b) was applied thereto. The coated non-woven sheet material was then passed through the warm air oven for about 1½ minutes to partially cure the coating layer.

(d) The patterned polyethylene sheet carrying the partially cured polyurethane layer was unrolled and the polyurethne coating layer thereon was brought into contact with the partially cured polyurethane coating layer of the non-woven sheet material by passage through nip rolls so that the coating layers adhered together. The resulting "sandwich" was wound up and stored, during curing of the polyurethane layers. After curing, the polyethylene sheet was stripped off in a simple rewinding operation to leave a coated non-woven sheet material with a patterned surface.

The process of the present invention can be used to coat any flexible sheet material, but is especially of use in coating woven and non-woven textile fabrics. After use, the embossed polyethylene may be cleaned and re-used, but its cost is low and re-use may not be economic. Another material suitable for use as the release band in the process of the invention is silicone treated paper. This, too, can be embossed and is suitable for our process, and its cost is comparable with that of polyethylene sheet. It may, however, be somewhat prone to crease during running through nip rolls, and has some of the other disadvantages of silicone rubber such as contamination. Furthermore, it does not readily lend itself to re-use.

What we claim is:

1. A method of forming a patterned surface sheet material from a slow-curing, tacky, plastic composition which comprises coating said composition on a patterned release band of which both faces possess release properties, adhering a fabric layer to the exposed surface of said coating rolling up said coating, fabric and release band, storing during curing of the coating, and thereafter removing the patterned coating, with the fabric adhered thereto, from the release band.

2. A method as claimed in claim 1, wherein the fabric layer is applied after the first coating of the slow-curing, tacky, plastic composition is partially cured.

3. A method as in claim 1 wherein said patterned release band is formed by heat softening a length of polyethylene sheet and embossing the sheet by passing the same between an embossing roll and a resilient pressure roll whereby the pattern on the embossing roll is duplicated in the surface of the slow-curing plastic composition.

4. A method of forming a patterned surface sheet material which comprises coating a slow-curing, tacky, plastic composition on a patterned release band of which both faces possess release properties, rolling up said coating and release band and storing until the coating is partially cured, unrolling the coating and release band and bringing the coating into contact with an adherable sub-strate, again rolling up the release band, coating and sub-strate, storing at least until curing of the coating is completed, and thereafter removing the coated sub-strate from the release band.

5. A method as claimed in claim 4, wherein the adherable sub-strate is a fabric coated with a layer of similar slow-curing, tacky, plastic composition.

6. A method as claimed in claim 5, wherein the layer of slow-curing, tacky, plastic composition on the adherable sub-strate is at least partially cured.

7. A method as claimed in claim 1, wherein the pattern on the release band is a relief pattern.

8. A method as claimed in claim 7, wherein the patterned release band is an embossed polyethylene sheet.

9. A method as claimed in claim 7, wherein the patterned release band is an embossed sheet of silicone treated paper.

10. A method of forming a patterned surface on a fabric which comprises coating a slow-curing, tacky polyurethane on a patterned polyethylene release band of which both faces possess release properties, passing the coated polyethylene release band through a warm air oven to partially cure said polyurethane, coating a fabric with said slow-curing, tacky polyurethane composition, passing the thus coated fabric through a warm air oven to partially cure the coating thereon, forming a sandwich of the coated polyethylene release band and coated fabric with the partially cured polyurethane coatings thereof in contact with each other, then rolling up said sandwich, storing the same in the rolled condition until the polyurethane curing is completed and then unrolling the sandwich and stripping off the polyethylene release band.

References Cited

UNITED STATES PATENTS

| | | | |
|---|---|---|---|
| 2,275,957 | 3/1942 | Groff | 156—238 |
| 2,556,078 | 6/1951 | Francis | 156—238 |
| 2,631,958 | 3/1953 | Francis | 156—238 |
| 3,078,179 | 2/1963 | Kuhn et al. | 117—47 |
| 2,566,982 | 9/1951 | Clemens et al. | 264—213 |
| 2,865,046 | 12/1958 | Bird | 156—232 |
| 2,874,416 | 2/1959 | Burnett | 264—216 XR |
| 3,265,776 | 8/1966 | Henkes | 264—1 |
| 3,269,882 | 8/1966 | Willy | 156—78 |

EARL M. BERGERT, *Primary Examiner.*

M. L. KATZ, *Assistant Examiner.*